United States Patent

[11] 3,612,763

[72] Inventor Paul V. Bates
Breslau, Ontario, Canada
[21] Appl. No. 819,279
[22] Filed Apr. 25, 1969
[45] Patented Oct. 12, 1971
[73] Assignee Electrohome Limited
Ontario, Canada

[54] NOISE SUPPRESSION NETWORKS FOR TELEVISION RECEIVERS
10 Claims, 6 Drawing Figs.

[52] U.S. Cl. .......... 178/7.3 R, 178/DIG. 12, 307/318, 328/165, 325/475, 325/476
[51] Int. Cl. .......... H04n 5/44
[50] Field of Search .......... 178/6 NS, 7.3 S, 7.5 S; 307/318; 328/165; 325/475, 476

[56] References Cited
UNITED STATES PATENTS

| | | | |
|---|---|---|---|
| 3,182,122 | 5/1965 | Kao | 178/7.3 S |
| 3,240,873 | 3/1966 | Hansen et al. | 178/7.3 S |
| 3,256,502 | 6/1966 | Momberger | 178/6 NS |

*Primary Examiner*—Robert L. Griffin
*Assistant Examiner*—Richard P. Lange
*Attorney*—Peter W. McBurney

ABSTRACT: Noise suppression in a television receiver is achieved by connecting a semiconductor device in Zener diode configuration between two sources of video signals of opposite polarity.

INVENTOR.
PAUL V. BATES
BY
PATENT AGENT

INVENTOR.
PAUL V. BATES
BY
PATENT AGENT

INVENTOR.
PAUL J. BATES
BY
PATENT AGENT

NOISE SUPPRESSION NETWORKS FOR TELEVISION RECEIVERS

This invention relates to noise suppression networks for television receivers. More particularly, this invention relates to a noise suppression network which employs a semiconductor device having a PN junction with a Zener characteristic and connected in Zener diode configuration.

It is desirable for the video signal that is supplied to the automatic gain control (AGC) and synchronization (sync) circuits of a television receiver to be as noise-free as possible. Noise suppression circuits of the type employing a biased diode, for example, have been used and perform a clipping function, i.e., noise pulses are clipped at the level of the sync pulse tips. While noise suppression circuits of this type are better than not having any noise suppression, the portions of the noise pulses not clipped are applied to the AGC and sync circuits, and this is undesirable. Improved noise suppression circuits operating on the cancellation principal have been designed and operated and avoid the aforementioned problem of clipping-type noise suppression circuits. However, cancellation type noise suppression circuits of the type of which I am aware are relatively expensive requiring the use of a number of components. In contrast, a noise suppression circuit in accordance with the instant invention requires only a semiconductor device having a PN junction that has a Zener characteristic and that is connected in Zener diode configuration, although, in some applications it may be necessary or desirable to employ a diode as well.

A television receiver embodying the instant invention has sources of video signals of opposite-going polarity, and, in accordance with the instant invention, a Zener diode or other device having a Zener characteristic is connected in Zener diode configuration between the two sources, i.e., with its anode connected to the positive source.

Figure 1A:
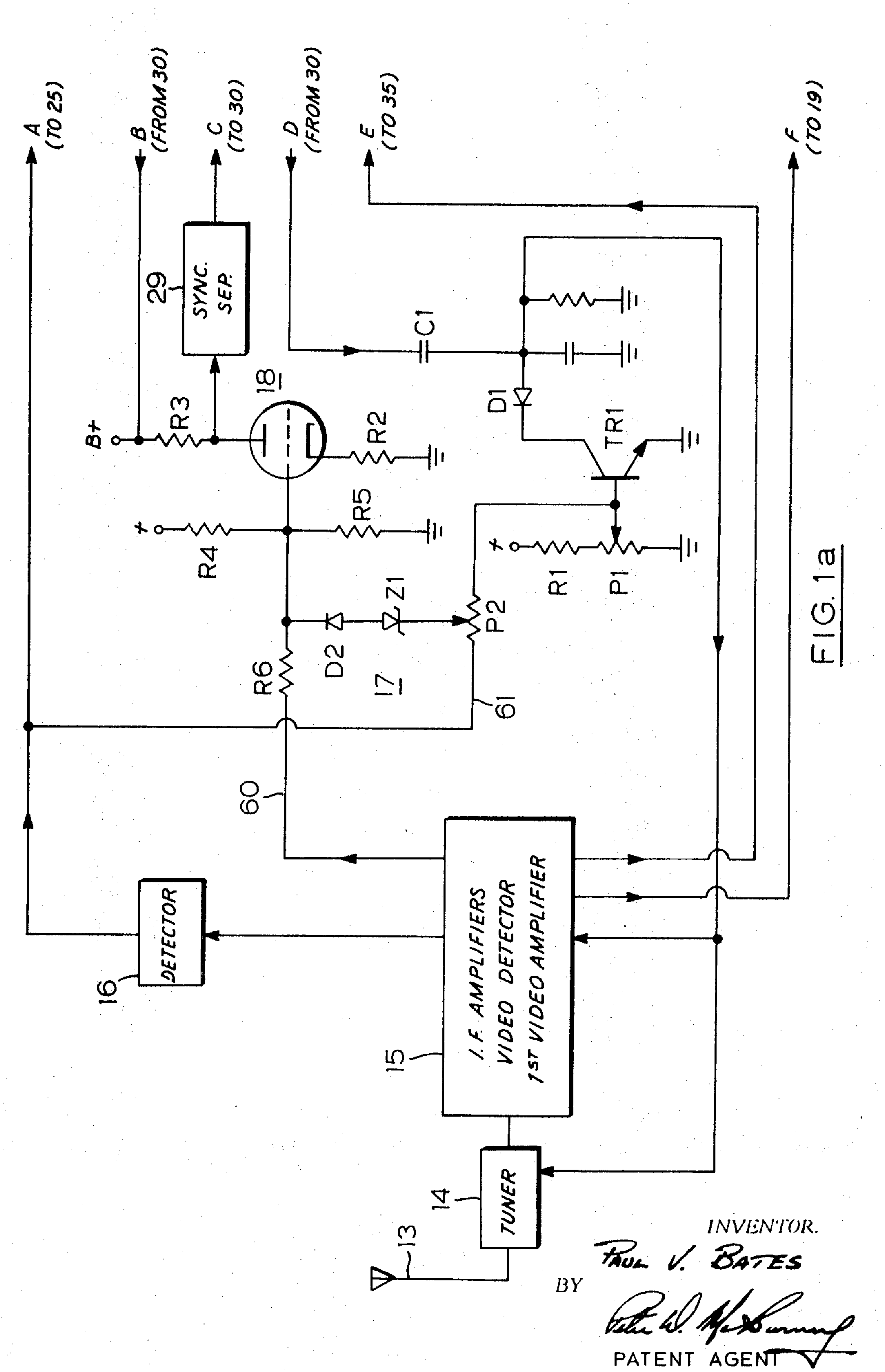
Figure 1B:
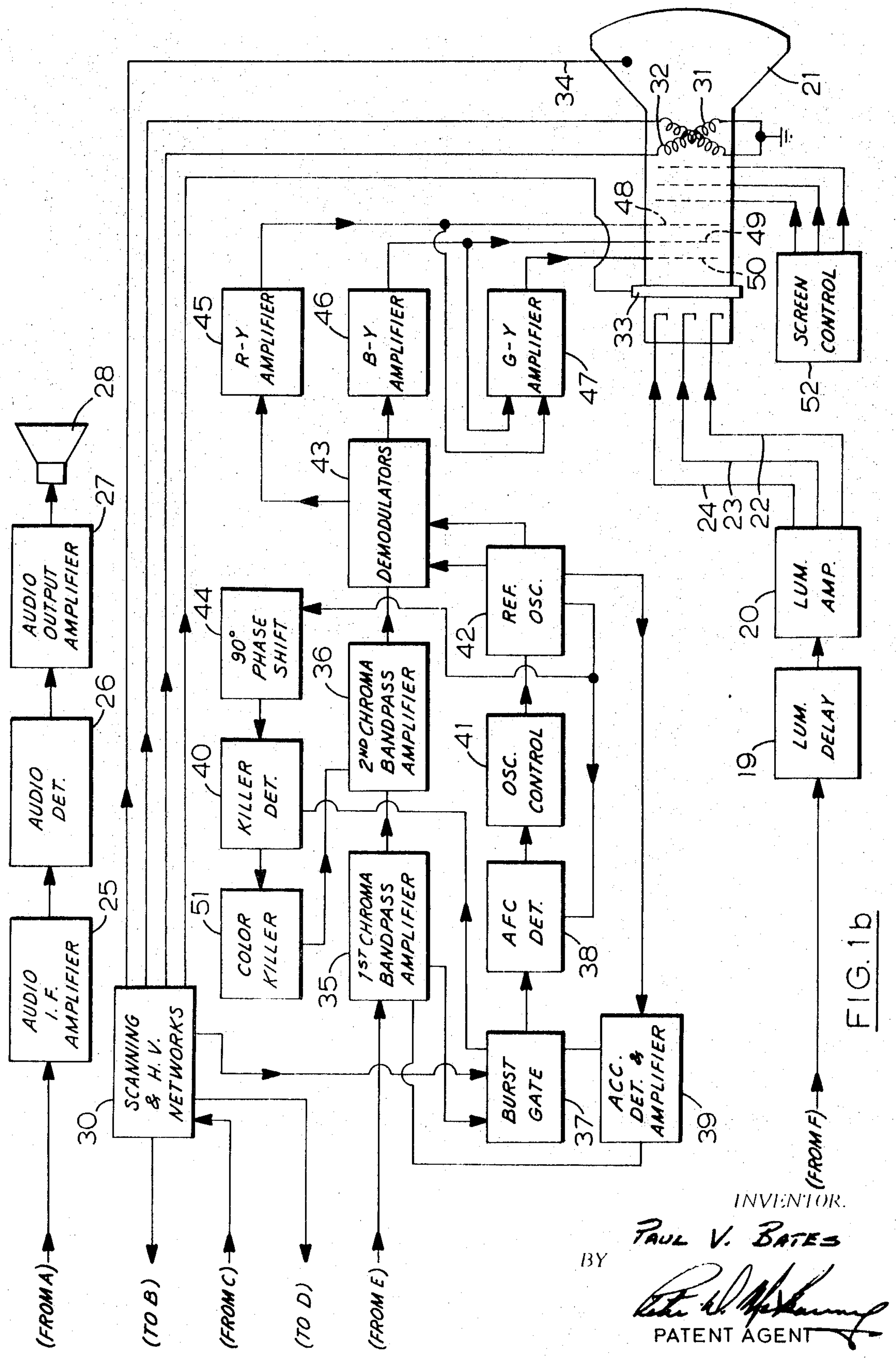
Figure 2:
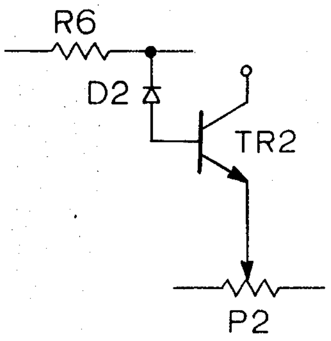
Figure 3:
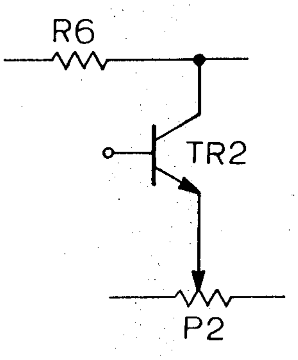
Figure 4:
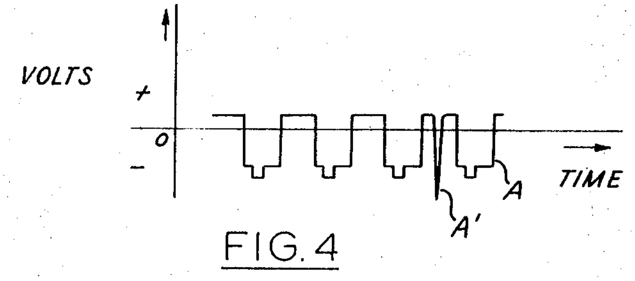
Figure 5:
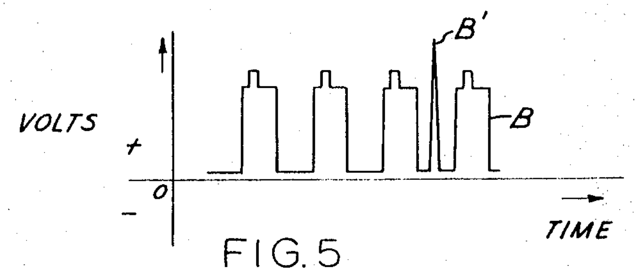

This invention will become more apparent from the following detailed description, taken in conjunction with the appended drawings, in which;

FIGS. 1*a* and 1*b* constitute a circuit diagram, partly in block form, of a color television receiver employing a noise suppression circuit embodying the instant invention;

FIGS. 2 and 3 illustrate other noise suppression circuits embodying the instant invention, and FIGS. 4 and 5 are graphs of voltage against time showing, somewhat schematically, waveforms that appear at two different points in the circuitry of FIG. 1*a*.

Referring to FIGS. 1*a* and 1*b*, those skilled in the art will appreciate that many of the components of the color television receiver shown therein are conventional, so only a brief description will be given of such components of the receiver and their mode of operation. The receiver includes an antenna 13 that is connected to the input terminal of a tuner 14 that comprises one or more radio frequency (R.F.) amplification stages, a mixer and a local oscillator, the latter two components constituting a first detector. Antenna 13 receives television signals broadcast on various channels, and the signal having a video carrier frequency corresponding to that of the channel selected is amplified by the R.F. amplifier or amplifiers and detected, the detected signal then being applied to a network designated 15 containing one or more intermediate frequency (I.F.) amplifiers, a video detector and a first video amplifier. The detected signal from tuner 14 has, as is well known, a video carrier frequency (I.F.) that is different from the video carrier frequencies of any of the VHF television signals received by antenna 13, usually being lower in frequency. The detected signal is amplified by the one or more I.F. amplifiers, the video components of the signal detected, and the video signal amplified by the first video amplifier.

The luminance component (Y) of the video signal is derived from network 15 in a known manner, delayed by a luminance delay network 19 and then applied to the luminance amplifier and drive control network 20 for the conventional three gun picture tube 21 of the receiver. As shown, the drive control network of the luminance amplifier has three output lines 22, 23 and 24 connected to the cathodes of the "red," "green" and "blue" electron guns respectively of picture tube 21.

The last I.F. amplifier of network 15 supplies its output signal to the video detector of network 15 as well as to an A.M. detector 16. The audio I.F. signal is derived from detector 16 in a known manner and supplied to an audio I.F. amplifier 25. The amplified audio I.F. signal is detected by an audio F.M. detector 26, the detected signal then being amplified by one or more stages of audio frequency (A.F.) amplification 27 and supplied to one or more loudspeakers 28.

In order to derive synchronizing (sync) information, the composite video signal from network 15 is applied to a network consisting of a noise suppression circuit 17 embodying this invention, a sync amplifier 18 and a sync separator 29. The sync signal output from sync separator 29 is applied to a network 30 containing the scanning and high-voltage circuits of the receiver. More specifically, network 30 comprises a horizontal scanning generator consisting of a line frequency oscillator, a phase detector and a frequency control stage for providing automatic control of the oscillator frequency; a vertical scanning signal generator; a horizontal convergence network; and a vertical convergence network. A horizontal scanning signal is developed and applied to the primary winding of an output transformer (not shown) having its secondary winding connected to the horizontal scanning coil 31 of the deflection yoke (not shown) of the receiver. A vertical scanning signal is developed and is coupled to the vertical scanning coil 32 of the deflection yoke of the receiver. Vertical and horizontal convergence signals also are developed and applied to a convergence yoke assembly shown schematically at 33. One high-voltage DC output line 34 of the high-voltage circuits of network 30 also is connected to picture tube 21.

An automatic gain control (AGC) system that develops an AGC potential for application to tuner 14 and one or more of the I.F. amplification stages of network 15 is provided. The AGC system basically is conventional in nature and includes a transistor TR1 and a diode D1. A resistor R1 and potentiometer P1 are connected in series between a terminal at a suitable positive potential and a terminal at ground potential. The base electrode of transistor TR1 is connected to the slider of potentiometer P1, so that the level of the AGC signal can be adjusted by movement of the slider of potentiometer P1. As is conventional, the anode of diode D1 is connected via a capacitor C1 to a horizontal pulse source within network 30. The collector electrode of transistor TR1 is connected to the cathode of diode D1, the emitter electrode of transistor TR1 being grounded.

The input signal to the AGC system is derived from detector 16 and is a video signal with positive-going polarity. It is shown in FIG. 5 and is applied to the base electrode of transistor TR1 via a potentiometer P2.

The operation of the AGC system shown is well known and need not be described in detail. As the video signal increases and decreases in strength, an AGC potential is developed by the AGC system and applied to tuner 14 and network 15, the AGC potential being such as to tend to keep the video signal at a constant strength.

The chrominance component of the video signal is derived from network 15 in a known manner, amplified by first and second chrominance band-pass amplifiers 35 and 36, a part of the chrominance signal being supplied from chrominance amplifier 35 to a color burst amplifier or gate 37. Keying pulses from network 30 are applied to color burst amplifier 37, and it supplies its output to an automatic frequency control (AFC) detector 38, an automatic chroma control (ACC) detector and amplifier network 39 and a killer detector 40. AFC detector 38 provides a control signal that is applied to an oscillator control device 41 that controls the frequency of a color or reference oscillator 42. The output signal of oscillator 42 is applied to ACC detector 39, AFC detector 38, color demodulators 43 and also to killer detector 40 via a 90° phase shift network 44. The output signal of chrominance band-pass amplifier 36 is applied to demodulators 43, which may comprise a pair of synchronous demodulators for developing a red color difference signal (R–Y) and a blue color difference signal (B–Y). A green color difference signal (G–Y) is obtained by matrixing the red and blue color difference signals; and these three signals are amplified by color difference amplifiers 45, 46 and 47 and applied directly or via keyed clamps (not shown) to the control grids 48, 49 and 50 respectively of the three electron guns of picture tube 21.

The operating frequency and phase of oscillator 42 corresponds to that of the color burst signal (3.58 MHz.), and the oscillator output signal and the signal from burst amplifier or gate 37 are compared in ACC detector 39. ACC detector 39 produces a signal indicative of the reception of a color signal and that varies in magnitude with the level of the received signal. This signal is supplied to chrominance band-pass amplifier 35 to vary the gain of this amplifier to compensate for variations in the level of the received signal. The output of a color killer network 51 is applied to chrominance band-pass amplifier 36 and determines whether this amplifier is biased on or off, color killer 51 being connected to killer detector 40. In the absence of a color burst signal, color killer 51 biases chrominance band-pass amplifier 36 off.

Reference numeral 52 designates a conventional screen grid control network connected to the three screen grid electrodes of the three guns of color picture tube 21.

An automatic fine tuning (AFT) system (not shown) may be connected between the local oscillator of tuner 14 and the last I.F. amplifier of network 15.

Sync amplifier 18 is conventional in nature and consists of an electron discharge device having plate, grid and cathode electrodes, the cathode being connected to ground via a resistor R2, the plate being connected to a suitable source of positive potential (B+) via a load resistor R3, and bias for the grid electrode being provided by connecting it to the common terminal of two resistors R4 and R5 connected in series with each other between a terminal at a suitable positive potential and a terminal at ground potential.

The input signal to the grid electrode of sync amplifier 18 is applied thereto via a resistor R6 and is derived from the video detector of network 15. It is a video signal with negative-going polarity and is shown schematically in FIG. 4.

It will be apparent from the foregoing that the signals A and B of FIGS. 4 and 5 respectively appear on conductors 60 and 61 (FIG. 1*a*) and are identical to each other except in amplitude and phase, the signals A and B being 180° out of phase with each other.

Noise suppression circuit 17 consists of a Zener diode Z1 and a diode D2 connected in series circuit with each other between conductors 60 and 61, i.e., between the sources of opposite polarity video signals A and B. Diode D2 and Zener diode Z1 are connected with opposite polarity, the anode of diode D2 and the anode of Zener diode Z1 being connected together.

In the embodiment of the invention shown in FIG. 2, Zener diode Z1 is replaced by the base-emitter junction of a transistor TR2.

In the embodiment of the invention shown in FIG. 3, diode D2 is replaced by the collector-base junction of a transistor TR2, while Zener diode Z1 is replaced by the base-emitter junction of transistor TR2.

The use of diode D2 is not essential to a noise suppression circuit embodying this invention. Diode D2 serves an important function, however, as will become more apparent hereinafter, and may be necessary or desirable in certain applications.

The operation of noise suppression circuit 17 now will be discussed with reference to FIG. 1*a*. The cathode of Zener diode Z1 is connected to the slider of potentiometer P2, so that by varying the position of the slider of potentiometer P2, it is possible to set the difference in voltage between the negative and positive sync pulse tips of signals A and B at the Zener voltage of Zener diode Z1 plus the forward voltage drop of diode D2. After this has been done, upon appearance of any noise pulse $A^1$ and $B^1$ (FIGS. 4 and 5) exceeding the sync pulse tips, conduction of Zener diode Z1 will occur, as will forward conduction of diode D2. Cancellation of noise pulse $A^1$ will result in this case because the positive-going noise pulse $B^1$ is larger than the negative-going noise pulse $A^1$. This will provide noise immunity for the sync system of the receiver, although some noise immunity for the AGC system will result as well. However, as far as the AGC system is concerned, noise suppression circuit 17 functions more like a clipper than a cancellation circuit. By adjusting the relative output impedances of the sources of signals A and B and the amplitudes of these signals, the degree of noise cancellation that will take place in the input signals to the sync and AGC systems can be predicted.

The function served by diode D2 is to prevent possible forward conduction of Zener diode Z1 during white excursions when the peak to peak video seen by the Zener diode exceeds the Zener voltage.

Threshold control potentiometer P2 may or may not be required depending upon the predictability of the two sources of signals A and B and the Zenered junction. As mentioned before, potentiometer P2 is set so that Zener diode Z1 holds off the cancellation of one polarity of video signal by the opposite polarity of video signal until a noise pulse occurs that exceeds the sync pulse tips.

In practicing the invention any semiconductor device having a PN junction that has a Zener characteristic and that is connected in Zener diode configuration may be used in place of Zener diode Z1, as, for example, shown in FIGS. 2 and 3 where the base-emitter junction of a transistor is used, this junction being connected in Zener diode configuration.

Of course the invention also is applicable to a black and white television receiver.

I claim:

1. In a television receiver having a first source of video signals with negative-going polarity and a second source of video signals with positive-going polarity, a network for at least partially cancelling noise from at least one of said signals, said network comprising a semiconductor device having anode and cathode electrodes and a PN junction that has a Zener characteristic and means connecting said junction in Zener diode configuration between said first and second sources for applying one of said video signals to one of said electrodes and the other of said video signals to the other of said electrodes, said semiconductor device operating as a Zener diode.

2. The invention according to claim 1 including a diode connected in series circuit with said semiconductor device between said sources and with opposite polarity.

3. The invention according to claim 1 wherein said semiconductor device is a Zener diode.

4. The invention according to claim 2 wherein said semiconductor device is a transistor having base, collector and emitter electrodes, said PN junction being the base-emitter junction of said transistor, said anode and cathode electrodes being selected from said base and emitter electrodes, said diode being the collector-base junction of said transistor.

5. The invention according to claim 1 including means for varying the magnitude of at least one of said video signals.

6. The invention according to claim 4 including means for varying the magnitude of at least one of said video signals.

7. The invention according to claim 1 wherein said television receiver includes an AGC network and a network for deriving synchronizing information, means for supplying said video signals of said first source to said AGC network, and means for supplying said video signals of said second source to said network for deriving synchronizing information.

8. The invention according to claim 7 including a diode connected in series circuit with said semiconductor device between said sources and with opposite polarity.

9. The invention according to claim 8 wherein said semiconductor device is a Zener diode.

10. The invention according to claim 7 wherein said semiconductor device is a transistor having base, collector and emitter electrodes, said PN junction being the base-emitter junction of said transistor, said anode and cathode electrodes being selected from said base and emitter electrodes, said diode being the collector-base junction of said transistor.